UNITED STATES PATENT OFFICE.

ELISHA C. LEONARD, OF NEW BEDFORD, MASSACHUSETTS.

IMPROVEMENT IN THE MANUFACTURE OF PARAFFINE CANDLES.

Specification forming part of Letters Patent No. 26,193, dated November 22, 1859.

*To all whom it may concern:*

Be it known that I, ELISHA C. LEONARD, of New Bedford, in the county of Bristol and State of Massachusetts, have invented an Improvement in Manufacturing Paraffine Candles; and I do hereby declare that the same is fully described as follows:

In carrying out my invention or process I heat the stock or paraffine to a temperature of about 165° Fahrenheit, after which I pour it into the molds heated to a temperature of about 200° Fahrenheit. Immediately after the molds may have been filled with the hot paraffine they should be plunged into a water bath cooled to about 40° Fahrenheit, and there suffered to remain for eight or ten minutes. Next, the molds, with the stock contained in them, are to be removed from the water bath, and suffered to remain exposed to ordinary atmospheric temperature for a short period of time—that is, for five minutes, or thereabout—after which the whole should be returned to the water bath, and there allowed to remain a sufficient time to thoroughly consolidate the stock and contract it to a sufficient degree to enable the candles to be easily drawn from the molds.

The main difference between my invention and that which constitutes the subject of the United States Patent No. 22,921 is that I do not employ any refrigerating air bath; but in the place thereof I expose the candles and molds for a short period of time to the atmosphere at an ordinary temperature, and afterward plunge the whole back again into the refrigerating water bath. I thus avoid the expenditure of ice necessary to cool an air bath, and, besides, gain other important advantages. I make the candles in a much shorter time, or, in other words, can do as much in one hour and a quarter as can be accomplished by the refrigerating air-bath process in two hours and a quarter. Again, by my improved process I can easily use the common molds with stationary tips, molds with movable tips being necessary to the refrigerating-air-bath process. By my process I accomplish by means of the cold-water bath the main chilling or cooling of the candle. In the first part of the process I so far chill the stock that on its removal from the water bath there is a small part of the stock in a limped or melted state around the wick. While the candle is in the air the caloric of the limpid stock will react upon the surrounding or solidified stock and operate to excellent advantage in rendering it homogeneous, or, in other words, cause the grains of stock to assume their proper positions. Next, the mold and stock are to be plunged back into the water bath in order to condense the stock by expelling or absorbing from it the remaining caloric and chilling it so as to reduce the size of the candles sufficiently to enable them to be withdrawn from the matrices.

I do not claim the employment of the heated mold and water and air baths at temperatures and in the manner described in the United States Patent numbered 22,921; but What I do claim is—

My improvement thereon, or improved process of treating paraffine in the manufacture of candles therefrom, whereby I am enabled to dispense with a refrigerating air bath cooled by artificial means, my improvement or invention consisting in the employment, in manner described, of the atmospheric temperature and the refrigerating water bath after the first cooling of the candle in the water bath.

ELISHA C. LEONARD.

Witnesses:
R. H. EDDY,
F. P. HALE, Jr.